(12) United States Patent
Inoko

(10) Patent No.: US 8,864,319 B2
(45) Date of Patent: Oct. 21, 2014

(54) IMAGING OPTICAL SYSTEM, LENS UNIT, AND IMAGE PROJECTION APPARATUS

(75) Inventor: Kazuhiro Inoko, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 143 days.

(21) Appl. No.: 13/563,939

(22) Filed: Aug. 1, 2012

(65) Prior Publication Data
US 2013/0033680 A1   Feb. 7, 2013

(30) Foreign Application Priority Data

Aug. 4, 2011   (JP) ................. 2011-170692

(51) Int. Cl.
G03B 21/20 (2006.01)
G02B 27/00 (2006.01)
G02B 13/16 (2006.01)
G02B 15/14 (2006.01)

(52) U.S. Cl.
CPC .............. *G02B 13/16* (2013.01); *G02B 27/005* (2013.01); *G02B 15/14* (2013.01)
USPC ................. 353/102; 353/30; 353/31; 353/33; 353/37; 353/98; 349/5; 349/7

(58) Field of Classification Search
CPC .............. G02B 13/16; G02B 26/0833; G02B 27/1033; G02B 27/0927; G02B 19/0028; G03B 21/00; H04N 9/3197; G03H 1/16; G11B 7/0065

USPC ............... 353/30, 31, 33, 37, 38, 98, 99, 102; 349/5, 7–9; 348/743–747

See application file for complete search history.

(56) References Cited

U.S. PATENT DOCUMENTS

| 7,077,546 B2 * | 7/2006 | Yamauchi et al. ............. 362/301 |
| 8,342,697 B2 * | 1/2013 | Iwanaga ........................... 353/94 |
| 2002/0048101 A1 * | 4/2002 | Miyabukuro .................. 359/871 |
| 2004/0189962 A1 * | 9/2004 | Suzuki ............................ 355/52 |
| 2005/0001985 A1 * | 1/2005 | Kitabayashi ..................... 353/31 |
| 2009/0161073 A1 * | 6/2009 | Kobayashi et al. ............. 353/20 |
| 2009/0219490 A1 * | 9/2009 | Vladimirovich et al. ....... 353/33 |

FOREIGN PATENT DOCUMENTS

| JP | 05-100187 A | 4/1993 |
| JP | 06-337396 A | 12/1994 |
| JP | 2005-189635 A | 7/2005 |

* cited by examiner

*Primary Examiner* — Sultan Chowdhury
(74) *Attorney, Agent, or Firm* — Rossi, Kimms & McDowell LLP

(57) ABSTRACT

An imaging optical system includes a lens unit that includes a plurality of optical elements, and an optical path combining portion that includes a flat plate disposed so as to be inclined with respect to an optical axis of the lens unit, and the lens unit includes a correction portion that has a shape asymmetric with respect to the optical axis in a cross section that is parallel to both a normal of the flat plate and the optical axis.

19 Claims, 8 Drawing Sheets

IMAGING OPTICAL SYSTEM, LENS UNIT, AND IMAGE PROJECTION APPARATUS

BACKGROUND OF THE INVENTION

1. Field of the Invention

The present invention relates to an imaging optical system, a lens unit, and an image projection apparatus.

2. Description of the Related Art

In a projector that uses a plurality of image panels, optical paths need to be combined before light beams enter a projection lens. When a reflective liquid crystal panel is used, a polarization splitting surface needs to be disposed between the reflective liquid crystal panel and the projection lens in order to separate incident light and emitted light. Conventionally, a projector that is configured by disposing a flat plate as a polarization splitting surface exists. However, when a light beam passes through a flat panel that is disposed so as to be inclined, various kinds of aberrations such as astigmatism are generated and therefore an imaging performance is deteriorated.

Japanese Patent Laid-Open No. H06-337396 discloses a configuration in which two flat plates that have inclination directions orthogonal to each other are used to compensate the astigmatism. Japanese Patent Laid-Open No. H05-100187 discloses a configuration in which a cylinder lens is disposed between a projection lens and an image panel to correct the astigmatism. Japanese Patent Laid-Open No. 2005-189635 discloses a configuration in which a cuneiform element is disposed between a projection lens and an image panel.

According to the configuration of Japanese Patent Laid-Open No. H06-337396, the astigmatism in a cross section along an inclination direction of the flat plate (an inclined angle cross section) can be improved. However, there is a skew ray that is a ray other than the inclination direction of the flat plate in real light beams, and therefore this configuration cannot correct aberration of the skew ray and the imaging performance cannot be sufficiently recovered. Furthermore, Japanese Patent Laid-Open No. H06-337396 discloses a configuration in which two flat plates are disposed in an area of the back focus between the projection lens and the image panel. However, in this configuration, the projection lens needs long back focus and it is undesirable because the weight is heavier along with the enlargement of a lens diameter, the cost is more expensive, and the design performance is deteriorated.

Additionally, in the configuration of Japanese Patent Laid-Open No. H05-100187, since the skew enters the inclined flat plate so as to be asymmetric between the upper side and the lower side, the astigmatism cannot be sufficiently corrected by the cylinder lens that has a shape that is symmetric between the upper side and the lower side.

Moreover, when the cuneiform element is used as disclosed in Japanese Patent Laid-Open No. 2005-189635, the astigmatism and the aberration of the skew ray can be simultaneously improved. However, in the configuration of Japanese Patent Laid-Open No. 2005-189635, the thickness of the cuneiform element is different in accordance with a position where the ray passes. Therefore, an image quality for all image heights cannot be improved since an image plane tilt is generated. Thus, in any cases, the deterioration of the image quality that is caused by the flat plate cannot be sufficiently recovered.

SUMMARY OF THE INVENTION

The present invention provides an imaging optical system that suppresses the deterioration of the imaging performance with an easy configuration in the imaging optical system that is provided with a flat plate inclined with respect to an optical axis in an area of the back focus.

An imaging optical system as one aspect of the present invention includes a lens unit that includes a plurality of optical elements, and an optical path combining portion that includes a flat plate disposed so as to be inclined with respect to an optical axis of the lens unit, and the lens unit includes a correction portion that has a shape asymmetric with respect to the optical axis in a cross section that is parallel to both a normal of the flat plate and the optical axis.

A lens unit as another aspect of the present invention includes a plurality of optical elements and a correction portion that has a shape asymmetric with respect to an optical axis.

An image projection apparatus as another aspect of the present invention includes a light modulation element configured to modulate light from a light source, and the imaging optical system, and light from the light modulation element is projected onto a projection surface via the imaging optical system.

Further features and aspects of the present invention will become apparent from the following description of exemplary embodiments with reference to the attached drawings.

DESCRIPTION OF THE PREFERRED EMBODIMENTS

Figure 1:
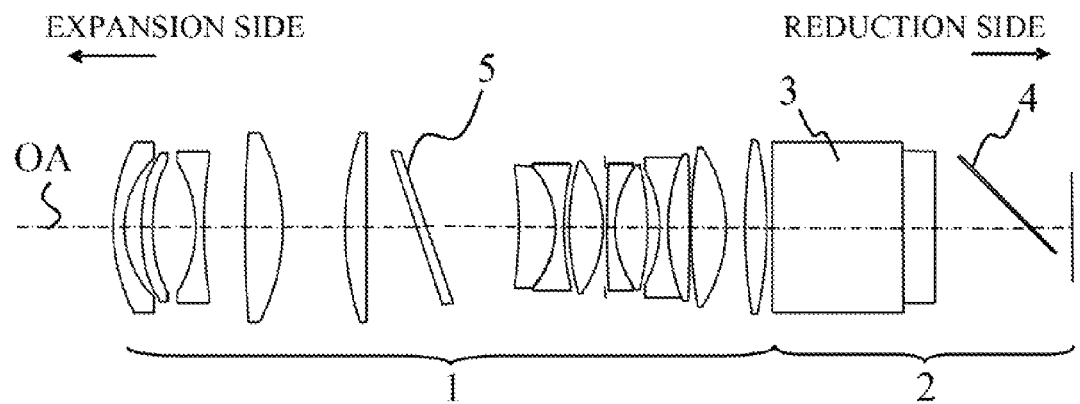
FIG. 1 is a cross-sectional view of an imaging optical system in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, an imaging optical system in Embodiment 1 of the present invention will be described. FIG. 1 is a cross-sectional view of the imaging optical system in the present embodiment. The imaging optical system is configured by including a lens unit 1 and a color combining portion 2 (an optical path combining portion). The lens unit 1 is configured by including a plurality of optical elements (lenses). In the present embodiment, the lens unit 1 is a retro-focus type single focus lens which is configured by a total of 14 lenses, and a second lens is an aspherical lens (both sides). Moreover, the lens unit 1 includes a correction portion 5 that has a shape asymmetric to an optical axis OA inside it (in the optical path). The lens unit 1, for example, projects the light modulated by an image panel (a liquid crystal display element, or a light modulation element) onto a screen (a projection plane).

The color combining portion 2 is provided inside an area of the back focus, which is configured by including a prism 3 and a flat plate 4 (an inclined flat plate) that is inclined by 45 degrees with respect to the optical axis OA. As the prism 3, for example, a color combining prism that is configured by holding a dielectric multilayer such as a dichroic prism using triangular prisms on both sides is used. As the flat plate 4, for example, a plate-shaped reflective polarization plate is used. The flat plate 4 of the present embodiment is a parallel plate, but the present embodiment is not limited to this and is also applied to a flat plate having other shapes. The correction portion 5 described above has a shape asymmetric to the optical axis OA on a cross section in an inclination direction of the flat plate 4 (the cross section illustrated in FIG. 1). The cross section in the inclination direction means a cross section parallel to both a normal of the flat plate 4 and the optical axis OA of the lens unit 1.

Table 1 is a numerical example in the present embodiment. In Table 1, the surface number denotes the number added to the surface of each lens in order from a screen side (an expansion side), symbol R denotes a radius of curvature, symbol d denotes an interval of surfaces (a physical interval with reference to the adjacent surface), and symbols nd and vd denote a refractive index of a glass material for d-line and Abbe's number, respectively. Symbol θ denotes an inclination angle of each surface where a rotation in an anti-clockwise direction with respect to an optical axis normal (a direction orthogonal to the optical axis) by a unit of degree. The inclination angle of each surface means an angle between an in-plane direction (a tangential direction) at a surface apex of each surface and the direction orthogonal to the optical axis. The surface passing the optical axis to which symbol "*" is added at the right side of the surface number has an aspherical shape that is represented by the following Expression (1). Coefficients A to E and K in the expression are indicated in Table 1. Symbol r in the expression denotes a distance from the optical axis OA to a radial direction of the lens unit 1, and symbol x denotes a distance from a position of r=0 to the optical axis direction.

$$x = (r^2/R)/[1+\{1-(1+K)(r^2/R^2)\}^{1/2}] + Ay^4 + By^6 + Cy^8 + Dy^{10} + Ey^{12} \quad (1)$$

TABLE 1

| | f = 29.7 ω = 23.7° F/1.96 | | | | |
|---|---|---|---|---|---|
| | R | d | nd | vd | θ |
| OBJ | ∞ | 2240.00 | | | 0.00 |
| 1 | 46.778 | 2.50 | 1.805 | 25.3 | 0.00 |
| 2 | 22.634 | 4.24 | | | 0.00 |
| 3* | 84.965 | 3.14 | 1.531 | 55.8 | 0.00 |
| 4* | 58.947 | 10.43 | | | 0.00 |
| 5 | −29.186 | 1.90 | 1.489 | 69.8 | 0.00 |

TABLE 1-continued

| | f = 29.7 ω = 23.7° F/1.96 | | | | |
|---|---|---|---|---|---|
| 6 | 109.955 | 10.59 | | | 0.00 |
| 7 | 337.095 | 7.28 | 1.773 | 49.5 | 0.00 |
| 8 | −48.773 | 14.45 | | | 0.00 |
| 9 | 76.566 | 4.99 | 1.820 | 30.6 | 0.00 |
| 10 | −4422.323 | 12.00 | | | 0.00 |
| 11 | ∞ | 2.26 | 1.516 | 64.1 | 20.61 |
| 12 | ∞ | 26.60 | | | 21.29 |
| 13 | −110.432 | 8.59 | 1.490 | 69.7 | 0.00 |
| 14 | −20.675 | 1.90 | 1.761 | 50.3 | 0.00 |
| 15 | −7528.397 | 0.94 | | | 0.00 |
| 16 | −205.738 | 5.55 | 1.487 | 70.1 | 0.00 |
| 17 | −25.389 | 0.50 | | | 0.00 |
| 18 | ∞ | 0.50 | | | 0.00 |
| 19 | 1286.096 | 1.90 | 1.710 | 31.4 | 0.00 |
| 20 | 22.866 | 7.72 | 1.487 | 70.1 | 0.00 |
| 21 | −44.899 | 2.62 | | | 0.00 |
| 22 | −25.233 | 1.90 | 1.683 | 35.6 | 0.00 |
| 23 | 54.681 | 4.55 | 1.508 | 67.7 | 0.00 |
| 24 | −176.094 | 0.50 | | | 0.00 |
| 25 | 116.045 | 12.10 | 1.487 | 70.1 | 0.00 |
| 26 | −32.760 | 0.50 | | | 0.00 |
| 27 | 108.396 | 4.84 | 1.805 | 25.3 | 0.00 |
| 28 | −150.374 | 1.50 | | | 0.00 |
| 29 | ∞ | 30.88 | 1.516 | 64.1 | 0.00 |
| 30 | ∞ | 7.50 | 1.516 | 64.1 | 0.00 |
| 31 | ∞ | 22.00 | | | 0.00 |
| 32 | ∞ | 1.00 | 1.516 | 64.1 | 45.00 |
| 33 | ∞ | 0.00 | | | 45.00 |
| 34 IMG | ∞ | | | | |

| | K | A | B | C |
|---|---|---|---|---|
| 3 | 0.000e+000 | 3.943e−005 | −6.465e−008 | 1.143e−010 |
| 4 | 0.000e+000 | 3.566e−005 | −8.188e−008 | 1.485e−010 |

| | D | E |
|---|---|---|
| 3 | 7.165e−014 | −3.857e−016 |
| 4 | −1.586e−014 | −5.280e−016 |

In the present embodiment, the correction portion 5 is a plate-shaped element (a cuneiform plate) that has a so-called cuneiform cross section having a predetermined apex angle in a cross section in the inclination direction (a paper direction) of the flat plate 4 that does not have the radius of curvature on both sides. In the present embodiment, the predetermined apex angle is 0.68 degree, but the present embodiment is not limited to this and may be set to an appropriate angle if necessary. In other words, the correction portion 5 is a flat plate that becomes thin as it gets away from a reduction side (a reduction conjugate side), and that becomes thick as it gets close to the reduction side. The reduction side means a side of the image panel such as the liquid crystal display element.

The correction portion 5 is configured by such a plate-shaped element, which is disposed by inclining by around 20 degrees in the same direction as the flat plate 4 (the same inclination direction) between a fifth lens and a sixth lens. An axial light beam passes through the fifth lens and then becomes a convergent light in heading toward the sixth lens. Therefore, in particular, the light at the upper side changes its direction in a downward direction after passing through the correction portion 5. Thus, the correction portion 5 is disposed so as to be inclined in the same direction as the flat plate 4 at a position where the axial light beam is converged by heading toward the reduction side. As a result, a focus position (a convergent position) of the light beam in the cross section of FIG. 1 can be moved in a downward direction of the paper plane. Since the focus position is moved in an upward direction by the flat plate 4 for the light beam in this cross section, the correction portion 5 compensates the movement of this light beam.

On the other hand, a light beam that has a high angle of field (a large angle of field) becomes thin compared to the axial light beam due to the falloff of the peripheral brightness, and also has a little amount of the astigmatism generated by the flat plate 4. However, since the correction portion 5 that is the cuneiform plate is inclined to the optical axis OA, the off-axis light beam enters the correction portion 5 at a shallow angle and an appropriate correction amount can be obtained. In addition, the correction portion 5 that is the cuneiform plate is inclined, a difference of refractive angles of the upper side ray and the lower side ray is generated, and an aberration of a skew ray that is generated by the flat plate 4 and that is asymmetric between the upper side and the lower side can also be corrected. In other words, since the correction portion 5 is disposed inside the lens unit 1 so as to be inclined with respect to the optical axis OA, aberrations at an entire image height can be simultaneously corrected.

Figure 2:
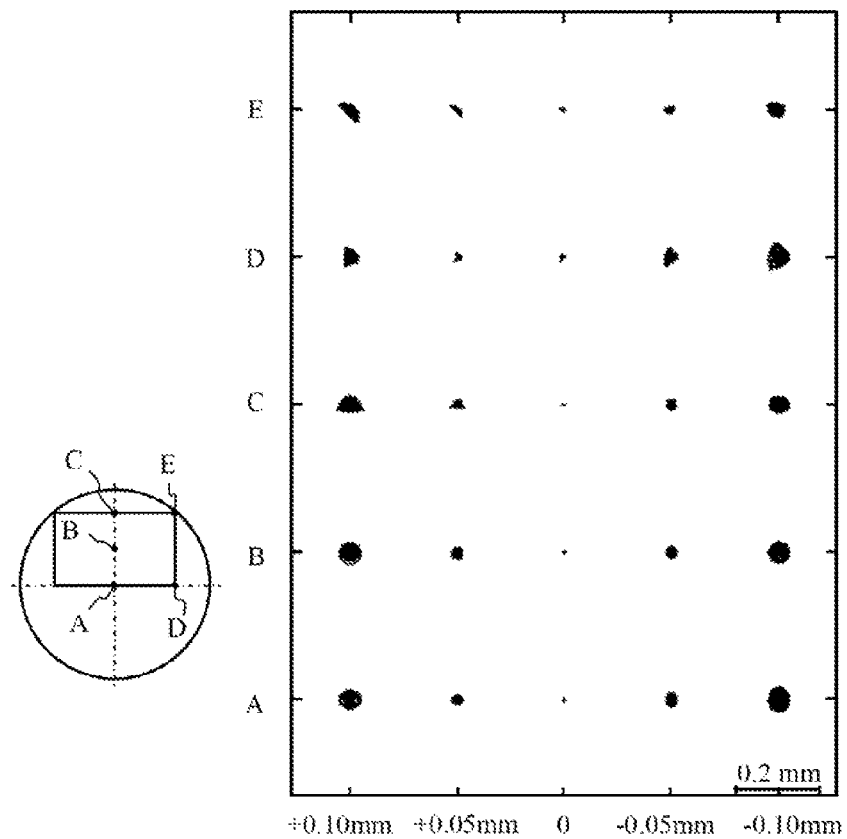
FIG. 2 is a spot diagram chart of the imaging optical system in Embodiment 1.

FIG. 2 is a spot diagram chart of illustrating an imaging performance of the imaging optical system in the present embodiment. The spot diagram chart of FIG. 2 illustrates defocus characteristics of arbitrary five points (A) to (E) of the image panel (the image element) in an image circle. The points (A) to (E) indicate positions at the bottom of the screen for (A), at the center of the screen for (B), at the top of the screen for (C), at the bottom right of the screen for (D), and at the top right of the screen for (E), respectively, where the image panel is shifted by 50%. The lateral axis indicates a defocus direction, which illustrates the spot diagram where the left side in the drawing is defocused at the expansion side (−) with respect to the best focus position and the right side in the drawing is defocused at the reduction side (+).

Figure 12:
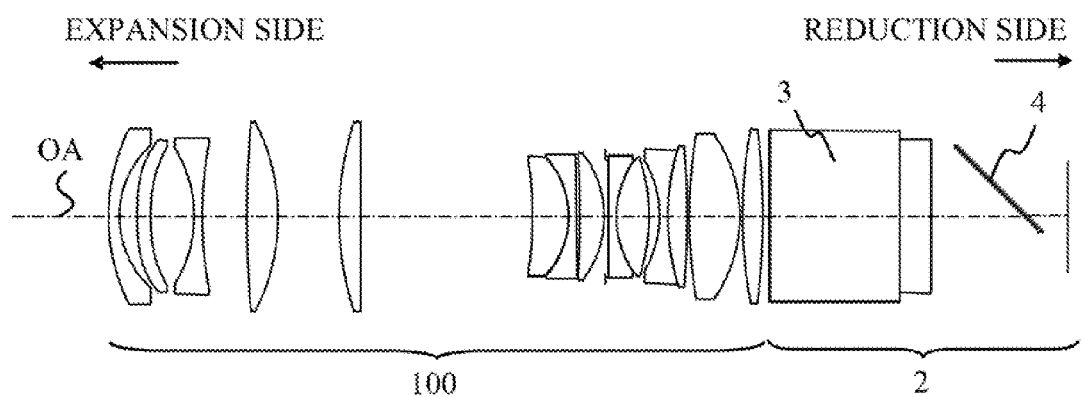
FIG. 12 is a cross-sectional view of an imaging optical system as a comparative example.
Figure 13:
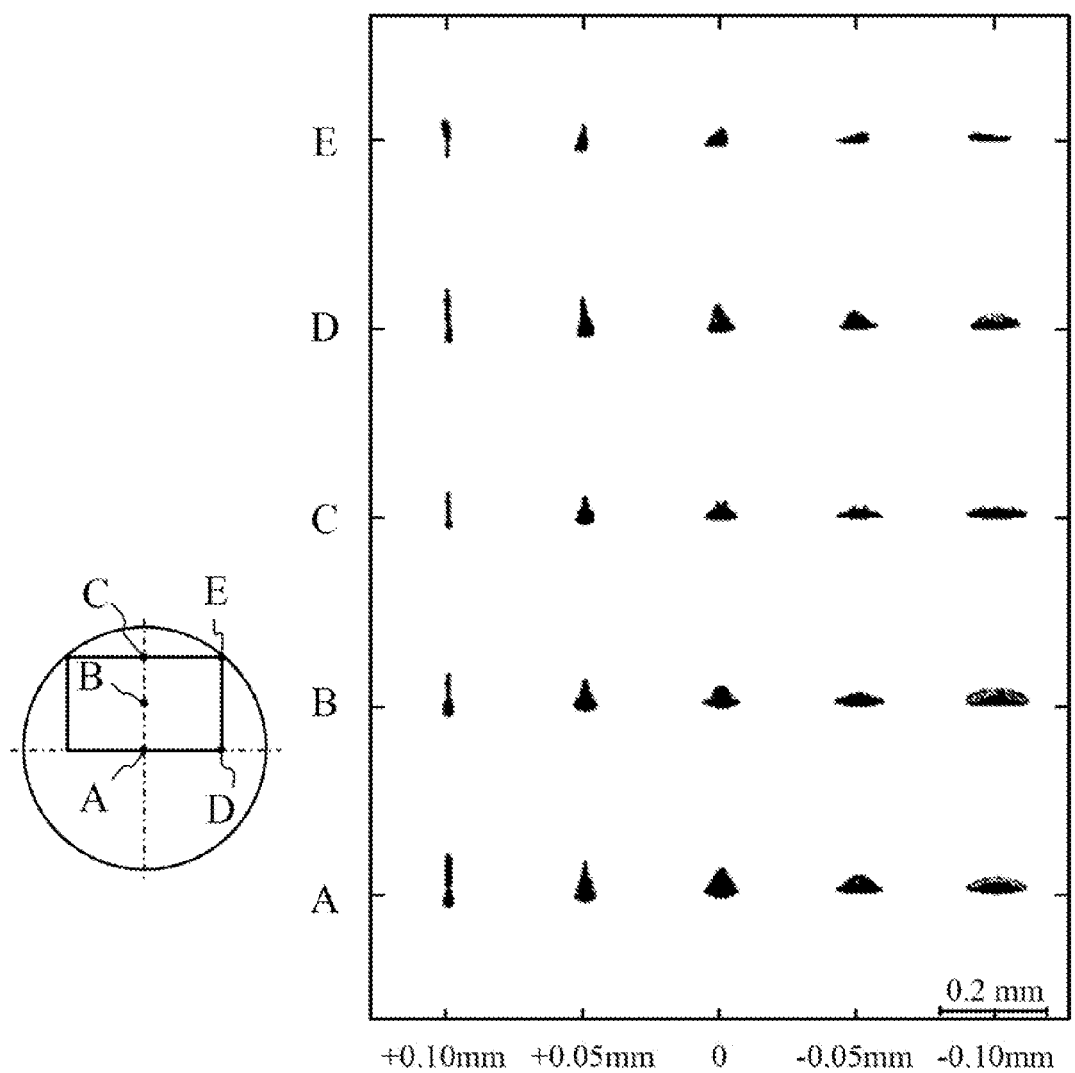
FIG. 13 is a spot diagram chart of the imaging optical system as the comparative example.

Subsequently, an imaging optical system as a comparative example will be described. FIGS. 12 and 13 are a cross-sectional view and a spot diagram chart where a lens unit 100 in which the correction portion 5 is removed from the imaging optical system of the present embodiment is used, respectively. As illustrated in FIG. 13, the spot at a balance focus position also has a rice ball shape instead of a circular shape since the aberration that is asymmetric between the upper side and the lower side is generated. In other words, in the imaging optical system that does not include any correction portion, the imaging performance is deteriorated. Comparing FIG. 2 with FIG. 13, the imaging performance of the imaging optical system is improved by the correction portion 5.

In the present embodiment, the correction portion 5 is disposed between the fifth lens and the sixth lens inside the lens unit 1, but the present embodiment is not limited to this. A correction effect similar to the effect of the present embodiment can also be obtained even when the correction portion 5 is disposed at another position inside the lens unit 1. The inclination angle of the correction portion 5 or the apex angle of the cuneiform plate may also be different in accordance with the design of a lens system (the lens unit). Which position the correction portion 5 should be disposed inside the lens unit 1 or the inclination angle or the inclination direction of the correction portion 5 can be appropriately changed in accordance with the design of the lens system.

In the present embodiment, the correction portion 5 is disposed at the position where the axial light beam is converged by heading toward the reduction side, and on the contrary, the correction portion 5 is disposed so as to be inclined in a reverse direction for the flat plate 4 when the correction portion 5 is disposed at a position where the axial light beam is converged by heading toward the expansion side (the expansion conjugate side).

Embodiment 2

Figure 3:
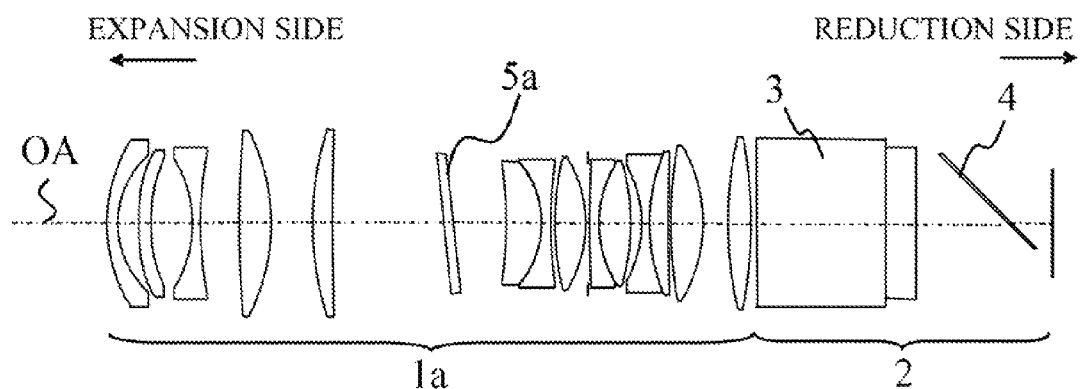
FIG. 3 is a cross-sectional view of an imaging optical system in Embodiment 2.

Next, an imaging optical system in Embodiment 2 of the present invention will be described. FIG. 3 is a cross-sectional view of the imaging optical system in the present embodiment. In the imaging optical system of the present embodiment, a correction portion 5a that is disposed inside a lens unit 1a has an apex angle of 0.59 degree and that is a cuneiform plate that is disposed so as to be inclined by around 6 degrees with respect to the optical axis OA. In addition, a surface at the reduction side of the correction portion 5a is a cylinder lens surface (a cylinder surface) that has a radius of curvature in a cross section in an inclination direction of the flat plate 4 (the cross section illustrated in FIG. 3). In the imaging optical system of the present embodiment, since the cylinder lens surface is provided in the imaging optical system of Embodiment 1, the correction of the skew ray and the correction of the image plane tilt can be more effectively realized, and higher performance can be obtained.

Table 2 is a numeric example in the present embodiment. The surface where symbol c is attached to the right side of the surface number indicates a cylinder lens surface that has a radius of curvature in a cross sectional direction of FIG. 3 and that does not have a radius of curvature in a direction orthogonal to the cross sectional direction.

TABLE 2 f = 31.9 ω = 22.2° F/1.96

| | R | d | nd | vd | θ |
|---|---|---|---|---|---|
| OBJ | ∞ | 2240.00 | | | 0.00 |
| 1 | 38.818 | 2.50 | 1.805 | 25.4 | 0.00 |
| 2 | 21.771 | 5.21 | | | 0.00 |
| 3* | 103.055 | 2.80 | 1.531 | 55.8 | 0.00 |
| 4* | 54.624 | 9.91 | | | 0.00 |
| 5 | −29.461 | 2.00 | 1.487 | 70.2 | 0.00 |
| 6 | 91.290 | 9.28 | | | 0.00 |
| 7 | 229.899 | 7.68 | 1.772 | 49.5 | 0.00 |
| 8 | −48.773 | 10.10 | | | 0.00 |
| 9 | 72.586 | 4.89 | 1.799 | 29.8 | 0.00 |
| 10 | 1031.063 | 26.71 | | | 0.00 |
| 11 | ∞ | 2.18 | 1.516 | 64.1 | 5.80 |
| 12c | −10709.183 | 12.60 | | | 6.39 |
| 13 | −129.975 | 8.89 | 1.487 | 70.2 | 0.00 |
| 14 | −22.152 | 2.00 | 1.740 | 52.6 | 0.00 |
| 15 | 93.129 | 1.09 | | | 0.00 |
| 16 | 72.300 | 7.49 | 1.487 | 70.2 | 0.00 |
| 17 | −29.542 | 0.50 | | | 0.00 |
| 18 | ∞ | 0.50 | | | 0.00 |
| 19 | 719.032 | 2.00 | 1.737 | 32.2 | 0.00 |
| 20 | 26.212 | 7.81 | 1.487 | 70.2 | 0.00 |
| 21 | −51.442 | 2.61 | | | 0.00 |
| 22 | −28.769 | 2.00 | 1.647 | 33.7 | 0.00 |
| 23 | 46.424 | 4.53 | 1.516 | 64.1 | 0.00 |
| 24 | 1170.261 | 0.50 | | | 0.00 |
| 25 | 107.362 | 7.75 | 1.487 | 70.2 | 0.00 |
| 26 | −36.166 | 6.15 | | | 0.00 |
| 27 | 105.088 | 5.29 | 1.805 | 25.4 | 0.00 |
| 28 | −122.001 | 1.50 | | | 0.00 |
| 29 | ∞ | 30.88 | 1.516 | 64.1 | 0.00 |
| 30 | ∞ | 7.50 | 1.516 | 64.1 | 0.00 |
| 31 | ∞ | 22.00 | | | 0.00 |
| 32 | ∞ | 1.00 | 1.516 | 64.1 | 45.00 |
| 33 | ∞ | 0.00 | | | 45.00 |
| 34 | ∞ | | | | |
| IMG | ∞ | | | | |

| | K | A | B | C |
|---|---|---|---|---|
| 3 | 0.000e+000 | 3.788e−005 | −7.495e−008 | 1.209e−010 |
| 4 | 0.000e+000 | 3.318e−005 | −8.717e−008 | 1.206e−010 |

| | D | E |
|---|---|---|
| 3 | 1.145e−014 | −4.033e−016 |
| 4 | −6.650e−014 | −4.813e−016 |

Figure 4:
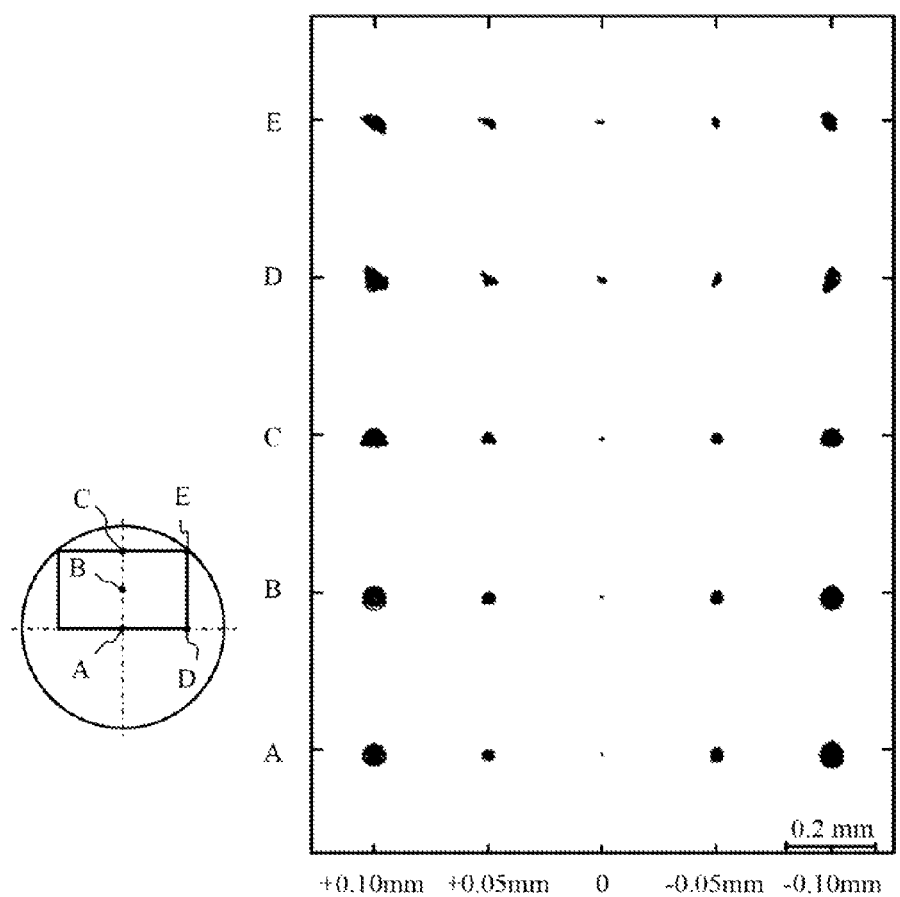
FIG. 4 is a spot diagram chart of the imaging optical system in Embodiment 2.

FIG. 4 is a spot diagram chart of illustrating an imaging performance of the present embodiment. Compared to Embodiment 1 (FIG. 2), since a degree of freedom that is a cylinder surface is increased, a correction at a higher level can be performed.

Embodiment 3

Figure 5:
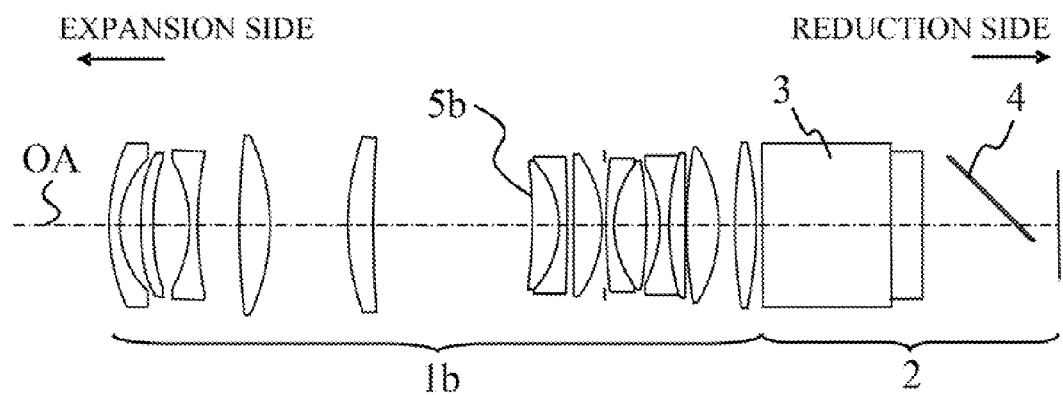
FIG. 5 is a cross-sectional view of an imaging optical system in Embodiment 3.

Next, an imaging optical system in Embodiment 3 of the present invention will be described. FIG. 5 is a cross-sectional view of the imaging optical system in the present embodiment. In the imaging optical system of the present embodiment, a correction portion 5$b$ that is provided inside a lens unit 1$b$ is provided as one lens surface instead of as a separated element, which is different from that of Embodiments 1 or 2.

The correction portion 5$b$ of the present embodiment is achieved by designing the expansion side surface of the sixth lens to be a free-form surface. The free-form surface means a curved surface that is not rotationally symmetric to the optical axis OA. The free-form surface of the present embodiment is a curved surface where the thickness of a free-form lens at a coordinate position having the same distance from the optical axis OA is thin at the upper side with respect to the optical axis OA in FIG. 5 and is also thick at the lower side with respect to the optical axis OA.

The shape of the correction portion 5$b$ (the free-form surface) in the present embodiment is represented by the following Expression (2). Symbol z denotes a distance from a position of r=0 to the optical axis direction, and symbol r denotes a distance from the optical axis OA of the lens unit 1$b$ to the radius direction. Symbol y denotes a distance from the optical axis OA to the cross sectional direction of FIG. 5 (a paper plane direction), which is perpendicular to the optical axis OA, and symbol x denotes a distance from the optical axis OA to a direction orthogonal to the y direction (a direction orthogonal to the paper plane direction), which is perpendicular to the optical axis OA. These are a coordinate system where the optical axis is set to zero.

$$z=(r^2/R)/[1+\{1-(1+K)(r^2/R^2)\}^{1/2}]+C_3y+C_4x^2+C_6y^2 \quad (2)$$

In Expression (2), symbol y contains both an even order and an odd order. In other words, it indicates to be a shape asymmetric between the upper side and the lower side in the cross sectional direction of FIG. 5 (the paper plane direction). On the other hand, symbol x only contains a term of an even order. In other words, it has a complete symmetric shape with respect to the direction orthogonal to the paper plane.

Table 3 is a numerical example in the present embodiment. The surface where symbol f is added to the right side of the surface number indicates the free-form surface that is defined as described above.

TABLE 3

| f = 31.3 ω = 22.6° F/1.96 | | | | |
|---|---|---|---|---|
| | R | d | nd | vd | θ |
| OBJ | ∞ | 2240.00 | | | 0.00 |
| 1 | 46.971 | 2.50 | 1.805 | 25.4 | 0.00 |
| 2 | 21.875 | 5.13 | | | 0.00 |
| 3* | 138.000 | 2.85 | 1.531 | 55.8 | 0.00 |
| 4* | 91.097 | 8.82 | | | 0.00 |
| 5 | −29.226 | 2.00 | 1.487 | 70.2 | 0.00 |
| 6 | 97.786 | 9.99 | | | 0.00 |
| 7 | 211.696 | 7.21 | 1.772 | 49.5 | 0.00 |
| 8 | −48.773 | 18.61 | | | 0.00 |
| 9 | 64.723 | 6.27 | 1.805 | 25.4 | 0.00 |
| 10 | 287.445 | 38.17 | | | 0.00 |
| 11f | −109.149 | 6.32 | 1.487 | 70.2 | 0.00 |
| 12 | −22.187 | 2.00 | 1.806 | 40.9 | 0.00 |
| 13 | −340.028 | 1.58 | | | 0.00 |

TABLE 3-continued

| f = 31.3 ω = 22.6° F/1.96 | | | | |
|---|---|---|---|---|
| 14 | 1355.802 | 6.69 | 1.487 | 70.2 | 0.00 |
| 15 | −28.869 | 0.50 | | | 0.00 |
| 16 | ∞ | 0.50 | | | 0.00 |
| 17 | 150.894 | 2.00 | 1.672 | 32.0 | 0.00 |
| 18 | 24.611 | 7.72 | 1.487 | 70.2 | 0.00 |
| 19 | −79.498 | 3.21 | | | 0.00 |
| 20 | −29.813 | 2.00 | 1.720 | 34.7 | 0.00 |
| 21 | 56.722 | 3.91 | 1.487 | 70.2 | 0.00 |
| 22 | 634.390 | 0.50 | | | 0.00 |
| 23 | 109.755 | 7.62 | 1.487 | 70.2 | 0.00 |
| 24 | −35.916 | 3.76 | | | 0.00 |
| 25 | 125.661 | 5.13 | 1.805 | 25.4 | 0.00 |
| 26 | −97.876 | 1.50 | | | 0.00 |
| 27 | ∞ | 30.88 | 1.516 | 64.1 | 0.00 |
| 28 | ∞ | 7.50 | 1.516 | 64.1 | 0.00 |
| 29 | ∞ | 22.00 | | | 0.00 |
| 30 | ∞ | 1.00 | 1.516 | 64.1 | 45.00 |
| 31 | ∞ | 0.00 | | | 45.00 |
| IMG | ∞ | | | | |

| | K | A | B | C |
|---|---|---|---|---|
| 3 | 0.000e+000 | 3.927e−005 | −6.522e−008 | 1.316e−010 |
| 4 | 0.000e+000 | 3.337e−005 | −7.495e−008 | 1.337e−010 |

| | D | E |
|---|---|---|
| 3 | 8.978e−015 | −5.159e−016 |
| 4 | −6.389e−014 | −6.378e−016 |

| | K | C3 | C4 | C6 |
|---|---|---|---|---|
| 11 | 0.000e+000 | 0.0085 | −8.388e−005 | −1.967e−005 |

Figure 6:
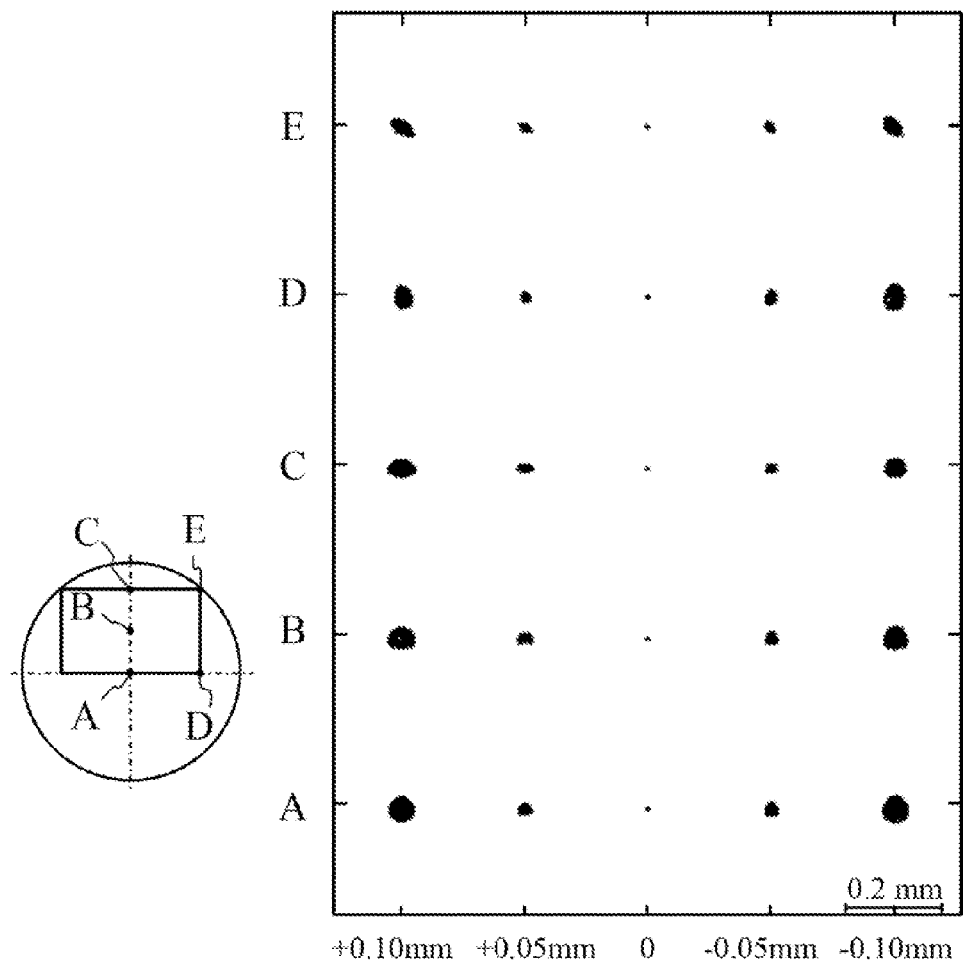
FIG. 6 is a spot diagram chart of the imaging optical system in Embodiment 3.

FIG. 6 is a spot diagram chart of illustrating an imaging performance of the imaging optical system in the present embodiment. Compared to Embodiments 1 and 2, since it is not necessary to increase the separated element as a correction portion, a space can be saved and a small-sized imaging optical system can be easily obtained.

The free-form surface of the present embodiment is formed on the sixth lens, but the present embodiment is not limited to this and it has only to be formed on any one of the plurality of lenses.

Embodiment 4

Figure 7:
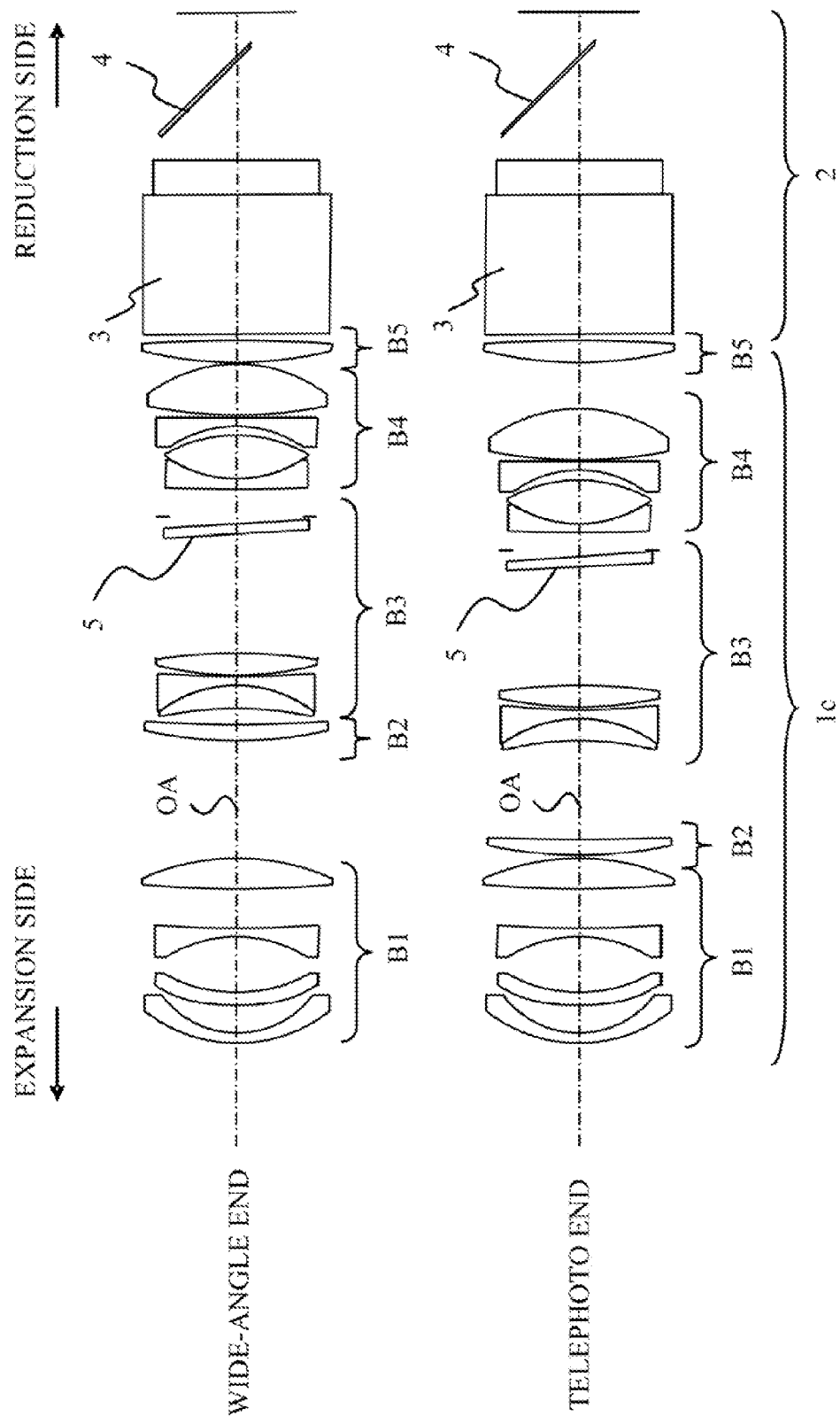
FIG. 7 is a cross-sectional view of an imaging optical system in Embodiment 4.

Next, an imaging optical system in Embodiment 4 of the present invention will be described. FIG. 7 is a cross-sectional view of the imaging optical system in the present embodiment. The imaging optical system of the present embodiment is a zoom lens of five lens units (a lens unit 1$c$) that is configured by a total of 13 lenses, and the lens units have negative, positive, positive, positive, and positive refractive indices in order from the expansion side, respectively. A second lens of the total of 13 lenses is an aspherical lens (both sides). FIG. 7 illustrates arrangements of the lens units at a wide-angle end and at a telephoto end. When a zooming operation is performed, a first lens unit B1 and a fifth lens unit B5 are fixed, and a second lens unit B2, a third lens unit B3, and a fourth lens unit B4 are moved. A main magnification-varying unit is the second lens unit B2. A correction portion 5 of the present embodiment is disposed in the third lens unit B3, which moves in accordance with the trajectory of the third lens unit B3 in the zooming operation. In other words, the correction portion 5 is configured so as to be movable in an optical axis direction in the zooming operation. The correction portion 5 of the present embodiment has the same configuration as that of Embodiment 1.

Table 4 is a numerical example in the present embodiment. In the table, the surface interval to which symbol z is added is an amount that changes along with the zooming operation.

TABLE 4 f = 29.5~33.4~34.5
ω = 23.7°~21.4°~20.7°
F/1.96~2.0~2.02

|  | r | d | nd | vd | θ |
|---|---|---|---|---|---|
| OBJ | ∞ | 2240.00 |  |  | 0.00 |
| 1 | 32.373 | 2.20 | 1.808 | 22.7 | 0.00 |
| 2 | 20.800 | 6.19 |  |  | 0.00 |
| 3* | 69.391 | 2.99 | 1.531 | 55.8 | 0.00 |
| 4* | 42.450 | 11.95 |  |  | 0.00 |
| 5 | −29.466 | 2.00 | 1.496 | 81.5 | 0.00 |
| 6 | 240.972 | 8.69 |  |  | 0.00 |
| 7 | 227.310 | 6.91 | 1.785 | 44.2 | 0.00 |
| 8 | −48.773 | 25.93z |  |  | 0.00 |
| 9 | 92.573 | 3.45 | 1.749 | 35.3 | 0.00 |
| 10 | 357.123 | 3.65z |  |  | 0.00 |
| 11 | −69.678 | 4.93 | 1.603 | 60.6 | 0.00 |
| 12 | −28.371 | 2.00 | 1.720 | 41.9 | 0.00 |
| 13 | 167.805 | 0.50 |  |  | 0.00 |
| 14 | 79.227 | 4.84 | 1.805 | 25.4 | 0.00 |
| 15 | −116.245 | 26.22 |  |  | 0.00 |
| 16 | ∞ | 2.16 | 1.516 | 64.1 | 3.17 |
| 17c | −9631.811 | 0.50 |  |  | 3.73 |
| 18 | ∞ | 7.38z |  |  | 0.00 |
| 19 | 443.594 | 2.00 | 1.805 | 25.4 | 0.00 |
| 20 | 26.681 | 9.77 | 1.487 | 70.2 | 0.00 |
| 21 | −31.031 | 1.93 |  |  | 0.00 |
| 22 | −25.541 | 2.00 | 1.647 | 33.7 | 0.00 |
| 23 | 15619.549 | 0.50 |  |  | 0.00 |
| 24 | 103.428 | 11.17 | 1.496 | 81.5 | 0.00 |
| 25 | −33.095 | 0.50z |  |  | 0.00 |
| 26 | 87.025 | 4.65 | 1.808 | 22.7 | 0.00 |
| 27 | −413.582 | 1.50 |  |  | 0.00 |
| 28 | ∞ | 30.88 | 1.516 | 64.1 | 0.00 |
| 29 | ∞ | 7.50 | 1.516 | 64.1 | 0.00 |
| 30 | ∞ | 22.00 |  |  | 0.00 |
| 31 | ∞ | 1.00 | 1.516 | 64.1 | 45.00 |
| 32 | ∞ | 0.00 |  |  | 45.00 |
| 33 | ∞ |  |  |  |  |
| IMG | ∞ |  |  |  |  |

|  | W | M | T |
|---|---|---|---|
| d8 | 25.93 | 6.11 | 0.50 |
| d10 | 3.65 | 18.52 | 21.83 |
| d18 | 7.38 | 5.16 | 4.80 |
| d25 | 0.50 | 7.66 | 10.33 |

|  | K | A | B | C |
|---|---|---|---|---|
| 3 | 0.000e+000 | 3.286e−005 | −6.573e−008 | 1.443e−010 |
| 4 | 0.000e+000 | 2.826e−005 | −8.108e−008 | 1.462e−010 |

|  | D | E |
|---|---|---|
| 3 | −5.886e−014 | −2.532e−016 |
| 4 | −7.392e−014 | −5.541e−016 |

Figure 8:
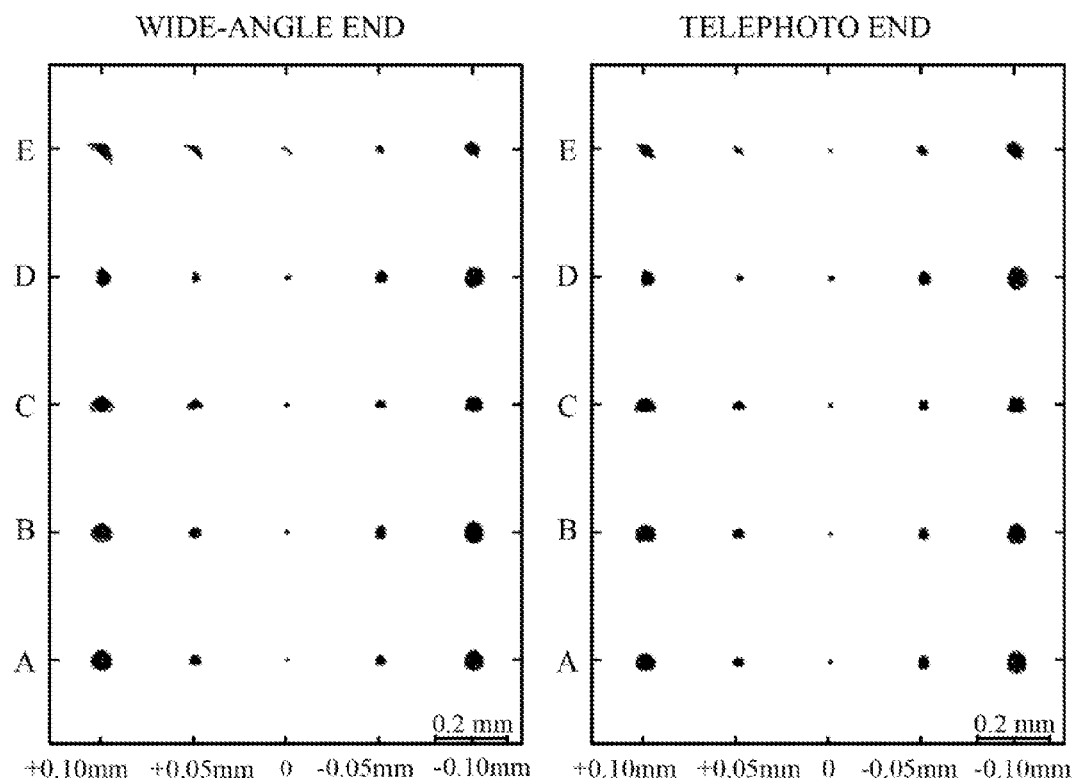
FIG. 8 is a spot diagram chart of the imaging optical system in Embodiment 4.

FIG. 8 is a spot diagram chart of illustrating the imaging performance of the imaging optical system in the present embodiment. Even when the imaging optical system is used as a zoom lens, the correction portion effectively improves the imaging performance.

In the present embodiment, the correction portion 5 moves along with the third lens unit B3, but it may also move as a separated unit. In this case, one moving unit increases, but for example, the angle of the correction portion can be changed in accordance with the zooming operation if an inclination angle of one cam is slightly changed. As a result, since the angle at which the ray passes through the correction portion can be optimized in accordance with a zoom position, a high imaging performance can be achieved even in a zoom system with higher magnification.

Embodiment 5

Figure 9:
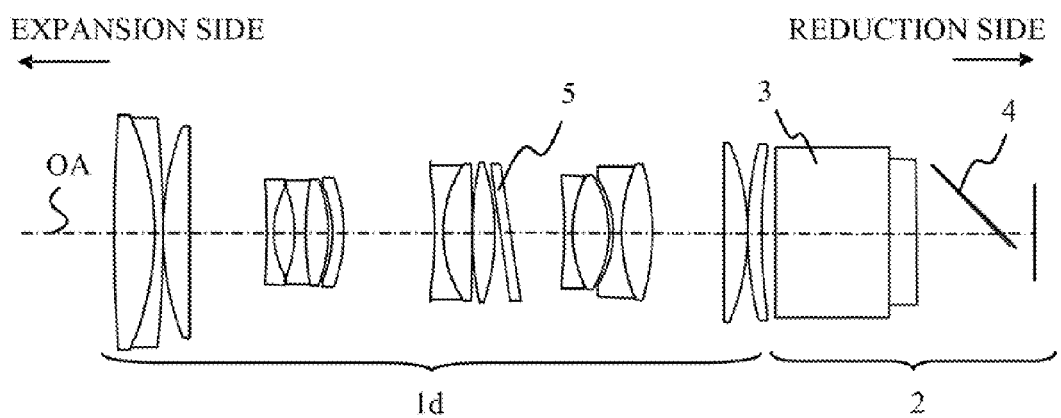
FIG. 9 is a cross-sectional view of an imaging optical system in Embodiment 5.

Next, an imaging optical system in Embodiment 5 of the present invention will be described. FIG. 9 is a cross-sectional view of the imaging optical system in the present embodiment. The lens unit 1 of the present embodiment is a telephoto type of a positive lead, which is a single focus lens that is configured by a total of 16 lenses. In a lens unit 1d, any aspherical lens is not used. A correction portion 5 is disposed between a tenth lens and an eleventh lens. Table 5 is a numerical example in the present embodiment.

TABLE 5 f = 58.9 ω = 12.55° F/2.04

|  | R | d | nd | vd | θ |
|---|---|---|---|---|---|
| OBJ | ∞ | 3770.00 |  |  | 0.00 |
| 1 | 394.213 | 11.00 | 1.654 | 39.6 | 0.00 |
| 2 | −76.468 | 2.20 | 1.805 | 25.4 | 0.00 |
| 3 | −366.123 | 0.10 |  |  | 0.00 |
| 4 | 79.961 | 7.23 | 1.834 | 42.7 | 0.00 |
| 5 | −8466.787 | 20.85 |  |  | 0.00 |
| 6 | −266.459 | 2.20 | 1.834 | 37.1 | 0.00 |
| 7 | 25.290 | 5.57 |  |  | 0.00 |
| 8 | −32.976 | 3.00 | 1.516 | 64.1 | 0.00 |
| 9 | 87.334 | 6.32 | 1.805 | 25.4 | 0.00 |
| 10 | −37.554 | 0.91 |  |  | 0.00 |
| 11 | −32.355 | 3.00 | 1.749 | 35.2 | 0.00 |
| 12 | −43.589 | 23.83 |  |  | 0.00 |
| 13 | ∞ | 0.94 |  |  | 0.00 |
| 14 | −134.380 | 2.20 | 1.672 | 32.0 | 0.00 |
| 15 | 32.012 | 8.00 | 1.651 | 58.5 | 0.00 |
| 16 | −692.615 | 0.10 |  |  | 0.00 |
| 17 | 100.901 | 6.21 | 1.805 | 25.4 | 0.00 |
| 18 | −60.345 | 1.50 |  |  | 0.00 |
| 19 | ∞ | 2.79 | 1.516 | 64.1 | 8.17 |
| 20 | ∞ | 14.57 |  |  | 9.00 |
| 21 | −121.273 | 2.20 | 1.805 | 25.4 | 0.00 |
| 22 | 32.562 | 9.94 | 1.487 | 70.2 | 0.00 |
| 23 | −29.653 | 1.48 |  |  | 0.00 |
| 24 | −26.474 | 2.00 | 1.740 | 27.7 | 0.00 |
| 25 | 44.987 | 8.40 | 1.712 | 53.8 | 0.00 |
| 26 | −64.463 | 19.38 |  |  | 0.00 |
| 27 | 2683.493 | 6.50 | 1.805 | 25.4 | 0.00 |
| 28 | −60.907 | 0.10 |  |  | 0.00 |
| 29 | 94.569 | 3.98 | 1.805 | 25.4 | 0.00 |
| 30 | 202.412 | 3.50 |  |  | 0.00 |
| 31 | ∞ | 30.88 | 1.516 | 64.1 | 0.00 |
| 32 | ∞ | 7.50 | 1.516 | 64.1 | 0.00 |
| 33 | ∞ | 22.00 |  |  | 0.00 |
| 34 | ∞ | 1.00 | 1.516 | 64.1 | 45.00 |
| 35 | ∞ | 0.00 |  |  | 45.00 |
| 36 | ∞ |  |  |  |  |
| IMG | ∞ |  |  |  |  |

Figure 10:
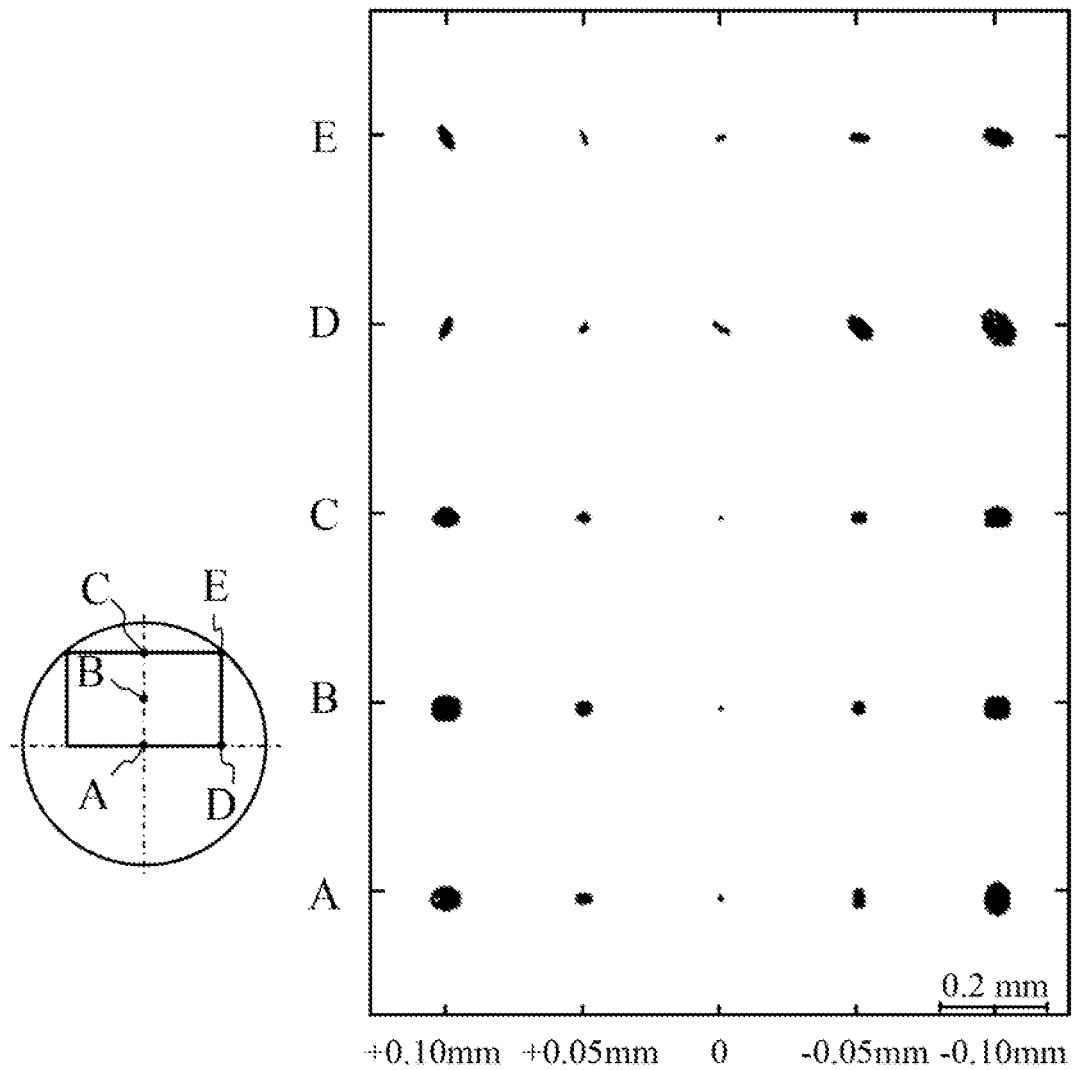
FIG. 10 is a spot diagram chart of the imaging optical system in Embodiment 5.

FIG. 10 is a spot diagram chart of illustrating an imaging performance of the present embodiment. Thus, even in the telephoto type lens system, the imaging performance can be effectively improved by the correction portion.

Embodiment 6

Figure 11:
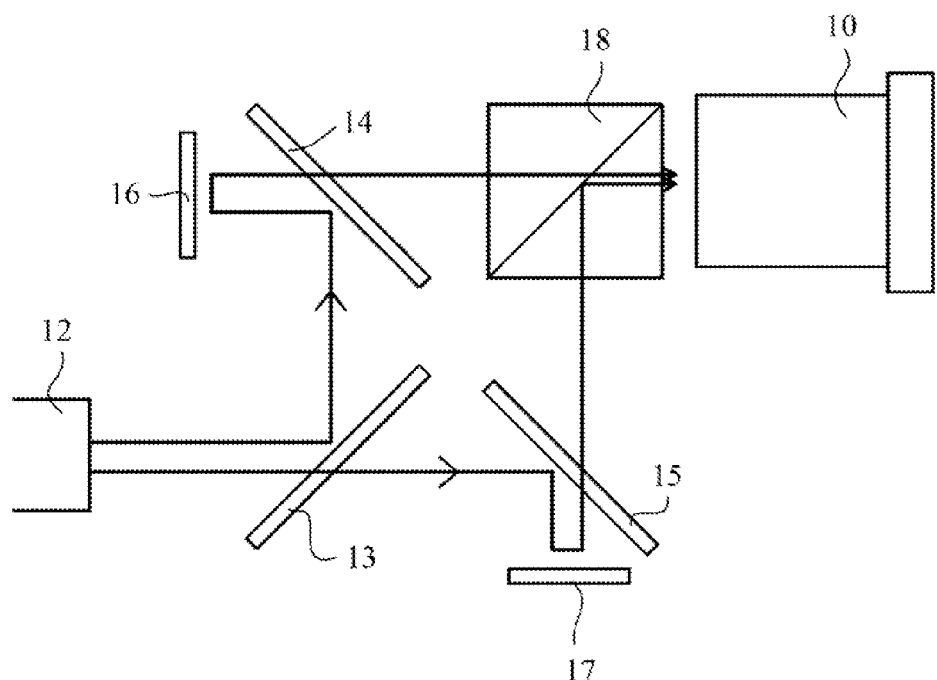
FIG. 11 is a schematic configuration diagram of a projector in Embodiment 6.

Next, a projector in Embodiment 6 of the present invention will be described. FIG. 11 is a schematic configuration diagram of a projector (an image projection apparatus) in the present embodiment. The projector of the present embodiment is a reflection type liquid crystal projector that includes any one of imaging optical systems of Embodiments 1 to 5.

A light beam emitted from a light source (not shown) enters a light beam splitting element 13 via an illumination optical system 12, and the incident light beam is separated into a plurality of light beams. The light beam splitting element 13 separates an optical path by wavelengths (colors) in a case where for example a dichroic mirror is used, or alternatively separates the optical path by polarization in a case where a polarizing beam splitter is used. The split light beams are reflected on reflective polarization plates 14 and 15, respectively. Each of the reflective polarization plates 14 and 15 includes a grating structure that is configured at pitches less than or equal to a wavelength, which has characteristics of reflecting polarized light in a grating direction and transmitting polarized light in a direction orthogonal to the grating direction. Commonly, a polarization conversion element is disposed in the illumination optical system, which is configured so that each of the polarized lights entering the reflective polarization plates 14 and 15 only contains reflected polarized light. Therefore, the split light beams are reflected on the reflective polarization plates 14 and 15 to enter reflective liquid crystal elements 16 and 17, respectively.

The reflective liquid crystal elements 16 and 17 rotates the polarized lights by 90 degrees, and the light beams reflected on the reflective liquid crystal elements 16 and 17 transmit through the reflective polarization plates 14 and 15 to enter a light beam combining element 18. The light beam combining element 18 combines the two light beams split by the light beam splitting element 13 to be guided to a projection lens 10 that is an imaging optical system. In the projector of the present embodiment, since the split light beams transmit through the reflective polarization plates 14 and 15, strong astigmatism is generated. Therefore, in a common projection lens (imaging optical system), a sufficient imaging performance cannot be obtained. On the other hand, according to the projector of the present embodiment, since any one of the imaging optical systems of Embodiments 1 to 5 is used as the projection lens 10, an excellent projection image can be obtained.

In the present embodiment, the reflective liquid crystal element is used, but the present embodiment is not limited to this and the effect of the present invention can also be obtained even when a projector that uses a transmissive liquid crystal element. In other words, if the present invention is applied to a projector in which a flat plat that combines optical paths is disposed between a projection lens and a liquid crystal element so as to be inclined with respect to a direction perpendicular to an optical axis of the projection lens, the effect that is similar to the present embodiment can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-170692, filed on Aug. 4, 2011, which is hereby incorporated by reference herein in its entirety.

What is claimed is:

1. An imaging optical system comprising:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis.

2. The imaging optical system according to claim 1, wherein the correction portion is a cuneiform plate that has a predetermined apex angle.

3. The imaging optical system according to claim 1, wherein the correction portion is a flat plate that becomes thinner with distance from a reduction side and that becomes thicker toward the reduction side.

4. The imaging optical system according to claim 1, wherein the correction portion is disposed so as to be inclined with respect to the optical axis.

5. The imaging optical system according to claim 1, wherein the correction portion is disposed so as to be inclined in the same direction as the flat plate at a position where an axial light beam is converted toward a reduction side.

6. The imaging optical system according to claim 1, wherein the correction portion is disposed so as to be inclined in an opposite direction to the flat plate at a position where an axial light beam is converted toward an expansion side.

7. The imaging optical system according to claim 1, wherein at least one surface of the correction portion is a cylinder surface that has a radius of curvature in a cross section that is parallel to the normal of the flat plate and the optical axis.

8. The imaging optical system according to claim 1, wherein the correction portion has a free-form surface that is formed on any one of the plurality of optical elements.

9. The imaging optical system according to claim 1, wherein the correction portion is configured so as to be movable in an optical axis direction in a zooming operation.

10. A lens unit comprising:
a plurality of optical elements; and
a correction portion that has a shape asymmetric with respect to an optical axis.

11. An image projection apparatus comprising:
a light modulation element configured to modulate light from a light source; and
an imaging optical system,
wherein light from the light modulation element is projected onto a projection surface via the imaging optical system, and
wherein the imaging optical system comprises:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis.

12. The imaging optical system according to claim 1, wherein the correction portion does not have a reflection surface with a curvature.

13. The imaging optical system according to claim 1, wherein:
the lens unit includes a moving lens unit that moves along an optical axis direction during zooming, and
the correction portion is disposed adjacent to the moving lens unit.

14. The imaging optical system according to claim 1, wherein:
the lens unit includes two moving lens units that move along an optical axis direction during zooming, and
the correction portion is disposed between the two moving lens units.

15. The imaging optical system according to claim 1, wherein light passes through all of the plurality of optical elements having a curvature system only once.

16. An imaging optical system comprising:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis, and
wherein the correction portion is a flat plate that becomes thinner with distance from a reduction side and that becomes thicker toward the reduction side.

17. An imaging optical system comprising:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis, and
wherein at least one surface of the correction portion is a cylinder surface that has a radius of curvature in a cross section that is parallel to the normal of the flat plate and the optical axis.

18. An image projection apparatus comprising:
a light modulation element configured to modulate light from a light source; and
an imaging optical system,
wherein light from the light modulation element is projected onto a projection surface via the imaging optical system, and
wherein the imaging optical system comprises:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis, and
wherein the correction portion is a flat plate that becomes thinner with distance from a reduction side and that becomes thicker toward the reduction side.

19. An image projection apparatus comprising:
a light modulation element configured to modulate light from a light source; and
an imaging optical system,
wherein light from the light modulation element is projected onto a projection surface via the imaging optical system, and
wherein the imaging optical system comprises:
a lens unit that includes a plurality of optical elements; and
an optical path combining portion that includes a flat plate disposed so as to be inclined with respect to an optical axis of the lens unit,
wherein the lens unit includes a correction portion that has a shape asymmetric with respect to the optical axis in a cross section that is parallel to both a normal of the flat plate and the optical axis, and
wherein at least one surface of the correction portion is a cylinder surface that has a radius of curvature in a cross section that is parallel to the normal of the flat plate and the optical axis.

* * * * *